US007062238B2

(12) United States Patent
Glaza

(10) Patent No.: US 7,062,238 B2
(45) Date of Patent: Jun. 13, 2006

(54) RADIO FREQUENCY SELECTION METHOD AND SYSTEM FOR AUDIO CHANNEL OUTPUT

(75) Inventor: Mark J. Glaza, Warren, MI (US)

(73) Assignee: General Motors Corporation, Detroit, MI (US)

( * ) Notice: Subject to any disclaimer, the term of this patent is extended or adjusted under 35 U.S.C. 154(b) by 551 days.

(21) Appl. No.: 10/324,910

(22) Filed: Dec. 20, 2002

(65) Prior Publication Data

US 2004/0121748 A1 Jun. 24, 2004

(51) Int. Cl.
*H04B 1/18* (2006.01)

(52) U.S. Cl. .............................. 455/161.1; 455/186.1; 455/184.1; 455/345

(58) Field of Classification Search ................ 455/557, 455/161.1, 179.1, 186.1, 184.1, 345, 99, 455/66.1, 187.1
See application file for complete search history.

(56) References Cited

U.S. PATENT DOCUMENTS

| 5,970,390 | A | * | 10/1999 | Koga et al. .................. 455/345 |
| 6,493,546 | B1 | * | 12/2002 | Patsiokas ..................... 455/345 |
| 2003/0236075 | A1 | * | 12/2003 | Johnson et al. ............... 455/99 |
| 2004/0192404 | A1 | * | 9/2004 | Zenios et al. ............. 455/569.1 |
| 2005/0049002 | A1 | * | 3/2005 | White et al. ............. 455/556.1 |

* cited by examiner

*Primary Examiner*—Lana Le
(74) *Attorney, Agent, or Firm*—Cardinal Law Group

(57) ABSTRACT

The present invention is a method and system for connecting an in-vehicle radio to a wireless device. A user selection input is provided to the in-vehicle radio. A local broadcast frequency is determined based on the user selection input. A broadcast request message including the local broadcast frequency is sent to the wireless device, and the radio is tuned to the local broadcast frequency.

21 Claims, 4 Drawing Sheets

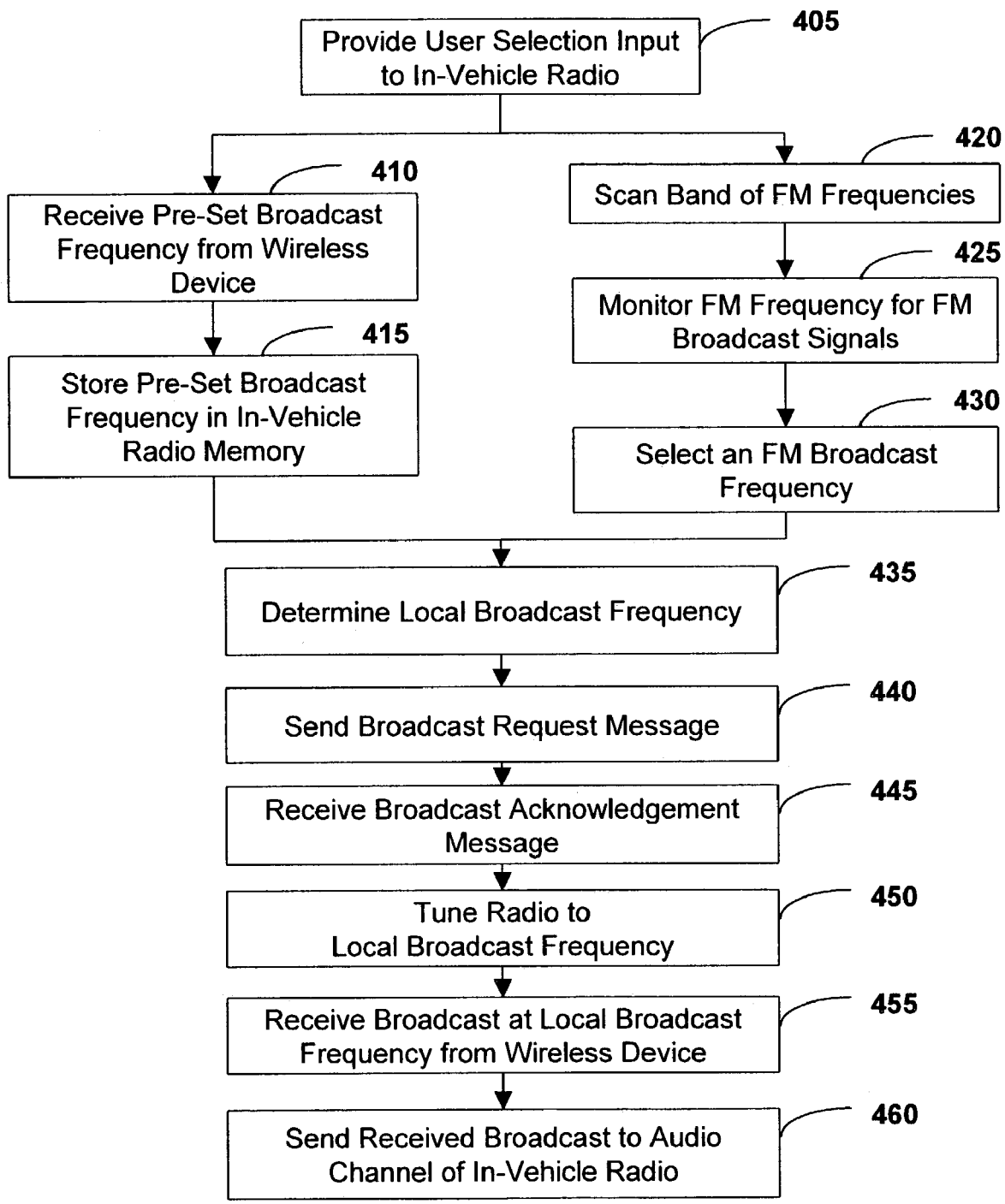

RADIO FREQUENCY SELECTION METHOD AND SYSTEM FOR AUDIO CHANNEL OUTPUT

FIELD OF THE INVENTION

This invention generally relates to the interconnection of wireless devices. In particular, the invention relates to a method and system for automatically determining an FM frequency for in-vehicle short-range broadcasts to an in-vehicle radio.

BACKGROUND OF THE INVENTION

Current and upcoming automotive communication technologies are combining wireless voice and data services to provide information and in-vehicle entertainment to drivers and their passengers. In extending the possibilities of in-vehicle communication, manufacturers of aftermarket electronic devices have designed wireless devices that send audio signals to in-vehicle radio receivers via radio frequency (RF) signals, which in turn send out the audio signals through audio speakers within the vehicles. For example, a typical wireless device, such as a compact disc (CD) changer/player, modulates its audio signal into an RF signal so that the existing FM tuner of a car audio system can receive the signal.

Most wireless devices such as the CD changer/player use a specific radio frequency for accessing a radio's audio output channels, and require that the radio be tuned to the specific frequency before the device can broadcast over an audio output channel of the radio. Preparing a wireless device to broadcast its audio signals through an in-vehicle radio has been a manual process, which often involves setting the wireless device to broadcast a particular frequency, and either manually tuning the radio to the same broadcast frequency or using one of the radio preset buttons to tune to that broadcast frequency. To use a radio's audio output channels, the radio needs to be tuned to a specific frequency before audio output from the device is heard. If the radio is not tuned to the frequency, the frequency is not known, or it has been forgotten, audio output from the device will not be heard, and it will appear as if the device is not working properly. It is desirable, therefore, to provide a system and method that overcomes these and other disadvantages.

SUMMARY OF THE INVENTION

The present invention is a system and method for connecting an in-vehicle radio to a wireless device. A user selection is provided to the in-vehicle radio. A local broadcast frequency is determined based on the user selection input. A broadcast request messaging including the local broadcast frequency is sent to the wireless device, and the radio is tuned to the local broadcast frequency. A broadcast acknowledgment message may be received from the wireless device. The local broadcast frequency may be determined from a pre-set broadcast frequency received from the wireless device. A pre-set broadcast frequency may be received from the wireless device, and stored in the in-vehicle radio. The local broadcast frequency may be determined by scanning a band of FM frequencies, monitoring at least one frequency in the FM band for an FM broadcast signal, and selecting an FM broadcast frequency free from an FM broadcast signal. The received broadcast may be sent to at least one audio channel of the in-vehicle radio. Another aspect of the invention includes a computer usable medium with a program to connect an in-vehicle radio to a wireless device.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 4 is a flow diagram of another embodiment of a method to connect an in-vehicle radio to a wireless device, in accordance with the current invention.

DETAILED DESCRIPTION OF THE PRESENTLY PREFERRED EMBODIMENTS

Figure 1:
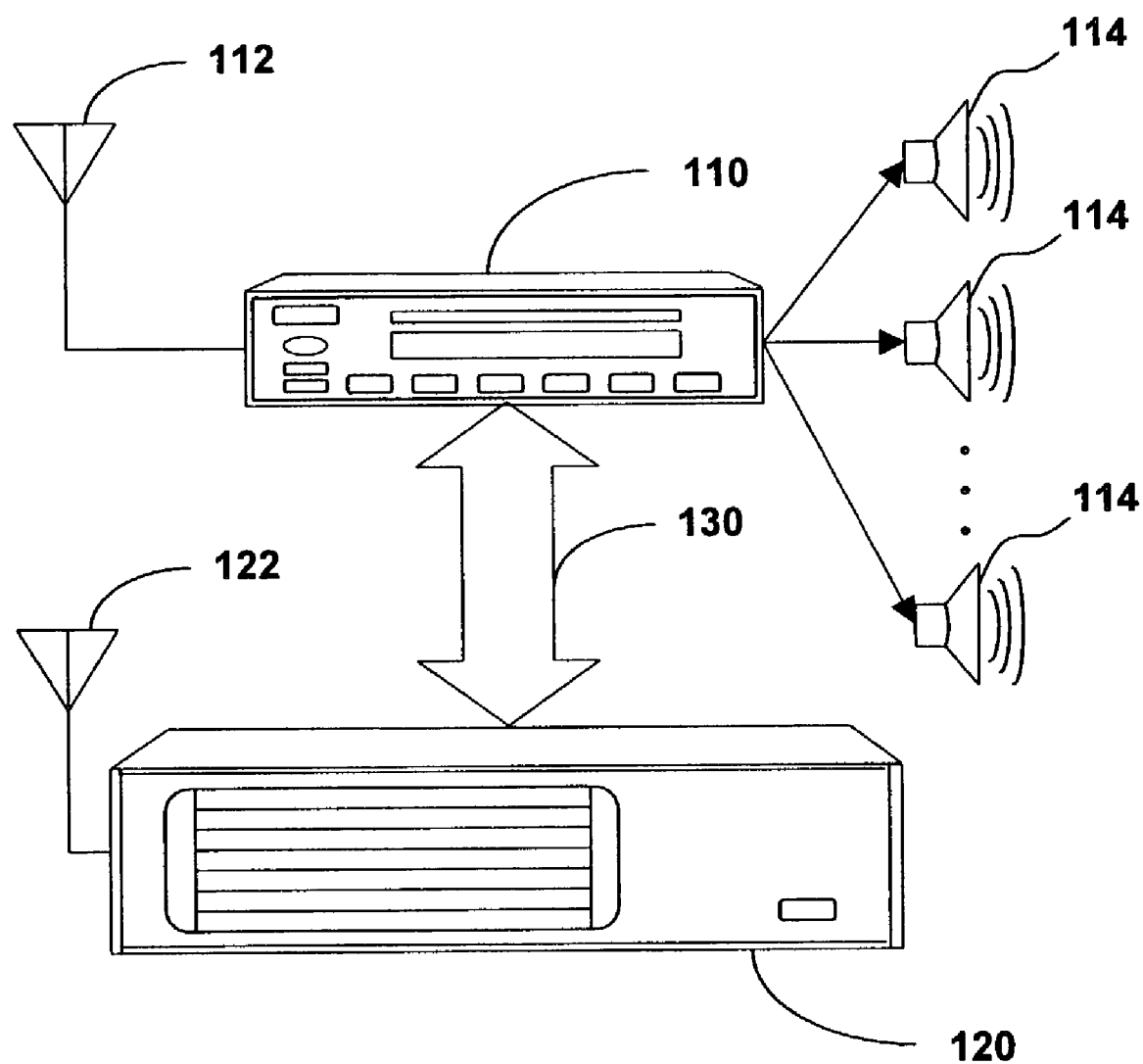
FIG. 1 is a schematic diagram of one embodiment of a system for connecting an in-vehicle radio to a wireless device, in accordance with the current invention.

FIG. 1 shows a schematic diagram of one embodiment of a system for connecting an in-vehicle radio to a wireless device, in accordance with the present invention at 100. In-vehicle connection system 100 includes a radio 110, an in-vehicle wireless device 120, and a wired or wireless communication link 130. Wireless device 120 transmits low-power, short-range FM radio transmissions to radio 110.

Radio 110 may receive broadcasts from wireless device 120 or from FM broadcast stations in the vicinity of the vehicle. Radio 110 typically receives AM or FM transmissions. FM broadcasts may be transmitted, for example, in the band between 87.5 MHz and 107.9 MHz. Radio 110 receives FM broadcasts at a selected broadcast frequency and demodulates the radio-frequency (RF) signal. Radio 110 is connected to an internal or external antenna 112 for receiving FM broadcasts. Radio 110 is enabled to receive broadcast signals by its tuner with associated filters for tuning the radio to the local broadcast frequency or any other frequency within the AM or FM band.

Radio 110 may contain a scanner for scanning through a band of predefined or preset FM frequencies, and an RF detector for monitoring a frequency in the FM band for an FM broadcast signal, and for determining the signal strength of any RF signals at the tuned frequency. The tuner may be tuned to a selected FM broadcast frequency free from an FM broadcast signal. Alternatively, the tuner may be tuned to a selected FM broadcast frequency containing an FM broadcast signal from either in-vehicle wireless device 120 or from a local FM station.

Radio 110 contains an amplifier to amplify the audio signal from the demodulated RF signal, and sends the audio signal over one or more audio channels to audio speakers 114 within the vehicle. Speakers 114 may be mounted in the dash, under the seats, in the doors, in the rear of the vehicle, or any suitable place within the vehicle.

Radio 110 includes an FM receiver, and may also include an AM receiver, cassette tape player, compact disc (CD)

player, digital video disc (DVD) player, or other information and entertainment devices. Radio 110 is typically mounted in the dash or console of a car or truck. Radio 110 contains an on/off switch and buttons, switches, a keypad, a touch screen, voice entry or other input devices such as a wireless remote for entering user selections and for providing user selection input to the in-vehicle radio. Radio 110 also includes capability to be connected to other devices within the vehicle such as wireless device 120 via a wired or wireless communication link 130.

Radio 110 includes a controller or processor and suitable programming code for determining a local broadcast frequency based on a user selection input, and hardware and software for sending broadcast request messages, broadcast acknowledgment messages, messages containing pre-set broadcast frequencies, and other messages between radio 110 and wireless device 120. Radio 110 may contain a volatile or non-volatile memory for storing pre-set broadcast frequencies and other information. Microcode running within radio 110 may include a program to connect an in-vehicle radio to a wireless device, to provide a user selection input to the in-vehicle radio, to scan a band of FM frequencies, to monitor at least one frequency in the FM band for an FM broadcast signal, to select an FM broadcast frequency free from an FM broadcast signal, to tune the radio to the local broadcast frequency or any desired broadcast frequency, to receive a broadcast at the local broadcast frequency or from a local station, and to send the broadcast to at least one audio channel of radio 110. The computer program code may be stored on any suitable computer usable medium such as, for example, read-only memory, programmable read-only memory, electrically erasable read-only memory, semiconductor memory, magnetic memory or optical memory discs such as CDs or DVDs.

Wireless device 120 includes an FM transmitter and an antenna 122 for transmitting low-power FM transmissions at a selected frequency that can be received by radio 110. Wireless device 120 may contain input devices such as a keypad, a dual in-line (DIP) switch, a wireless remote, or a wired remote for selecting device operation options or to select a pre-set or default FM frequency for local broadcast transmissions at a local broadcast frequency. Wireless device 120 may be, for example, an aftermarket compact disc player or a digital video disc player. Wireless device 120 may be a cellular phone, a personal digital assistant, or a laptop computer that a user wishes to play or hear over the vehicle audio system. Wireless device 120 may be a video game, an audio player, a video player, an entertainment system, a satellite radio receiver, a telematics unit, a hand-held wireless unit, or any portable communication device. Wireless device 120 includes capability to be connected to radio 110 via wired or wireless communication link 130. Additionally, wireless device 120 is capable of generating, sending, receiving, and responding to messages such as a broadcast request message or a broadcast acknowledgement message.

Communication link 130 connects radio 110 to in-vehicle wireless device 120 so that radio 110 and wireless device 120 may exchange messages and other data. Radio 110 and wireless device 120 may send and receive messages via communication link 130 that may be wired or wireless. Messages sent over communication link 130 may be sent, for example, via a wireless communication protocol such as a Bluetooth protocol, an IEEE 802.11 protocol, or a short-range wireless protocol. Messages sent over communication link 130 may be sent via a wired communication protocol such as an RS-232 protocol, a media oriented systems transport (MOST) protocol, a controller area network (CAN), an Ethernet protocol, a vehicle communication bus protocol, or any suitable wired protocol.

Figure 2:
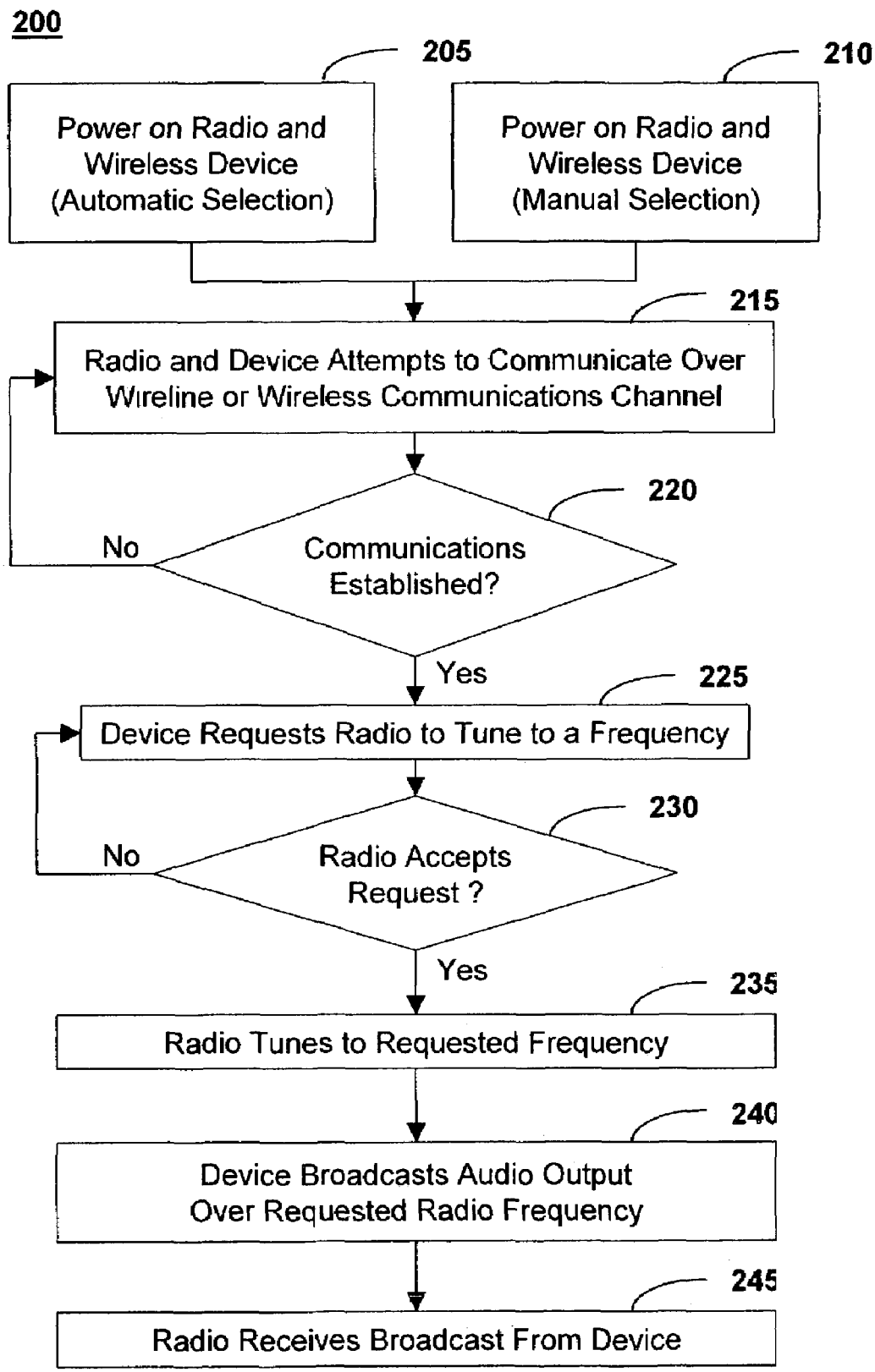
FIG. 2 is a flow diagram of one embodiment of a method to connect an in-vehicle radio to a wireless device, in accordance with the current invention.

FIG. 2 is a flow diagram of one embodiment of a method to connect an in-vehicle radio to a wireless device, in accordance with the present invention at 200. Radio and wireless device connection method 200, which uses a fixed frequency selection, begins with powering on the radio and wireless device, either automatically or manually. Exemplary wireless devices that may be used in the present invention are aftermarket compact disc players, digital video disc players, cellular phones, personal digital assistants (PDA), laptop computers, video games, audio players, video players, entertainment systems, satellite radio receivers, telematics units, portable communication devices, and the like.

With automatic selection, as seen at block 205, the radio and wireless device are powered on and the radio and wireless device connection method begins without any user input other than powering on the radio and wireless devices, for example, when starting the vehicle. With manual selection, as seen at block 210, the user initiates the radio and wireless device connection method with a user selection input such as an in-vehicle radio power-on detection, a button depression indication, a switch input, a voice message, a menu selection, a keypad entry, a touch screen input, a wireless remote input, a wireless device activation input, or the like. Based on a user input selection, the radio may determine a local broadcast frequency. For example, the radio may access information on a default broadcast frequency stored in internal memory such as, for example, flash or semiconductor memory.

The in-vehicle radio receiver and wireless device attempt to communicate over a wired or wireless communications channel, as seen at block 215. The communication channel or link between the device and the radio may be established over either a wired or a wireless link. Wired links, such as the vehicle communication bus or an aftermarket wiring harness, typically use a communication bus protocol such as RS-232, a media oriented systems transport (MOST) protocol, a controller area network (CAN) protocol, or an Ethernet protocol. Wireless links often use a wireless protocol such as a Bluetooth or IEEE 802.11 protocol.

The communication between radio and wireless device may or may not be successful, as seen at block 220. When the communication is not successful and a connection between the radio and device is not made, there may be additional attempts at communication made between the radio and the wireless device, as seen back at block 215. When the communication is successful, the wireless device, via a request message, requests the radio receiver to tune to a specific frequency at which the wireless device may send audio output signals to the radio, as seen at block 225. The specific frequency, such as 87.1 MHz, may be chosen based on a default broadcast frequency pre-set in the wireless device.

The radio may or may not accept the request of the wireless device for the radio receiver to tune to a specific frequency, as seen at block 230. When the radio does not accept the request of the wireless device, the wireless device may request the radio to tune to another frequency, as seen back at block 225. When the radio accepts the request of the wireless device, the radio tunes to the requested frequency, as seen at block 235.

Once the radio is tuned to the requested frequency, the wireless device broadcasts audio output signals over the requested radio frequency, as seen at block 240. The frequency required by the device can be stored in a computer usable medium such as a flash memory of the device, so that the device can attempt broadcasting at that same frequency the next time the device is used.

The radio receives the broadcast from the wireless device and may send the audio signals from the broadcast through audio output speakers, as seen at block 245. As a result, the wireless device has been enabled to use the audio output channels of the radio.

Figure 3:
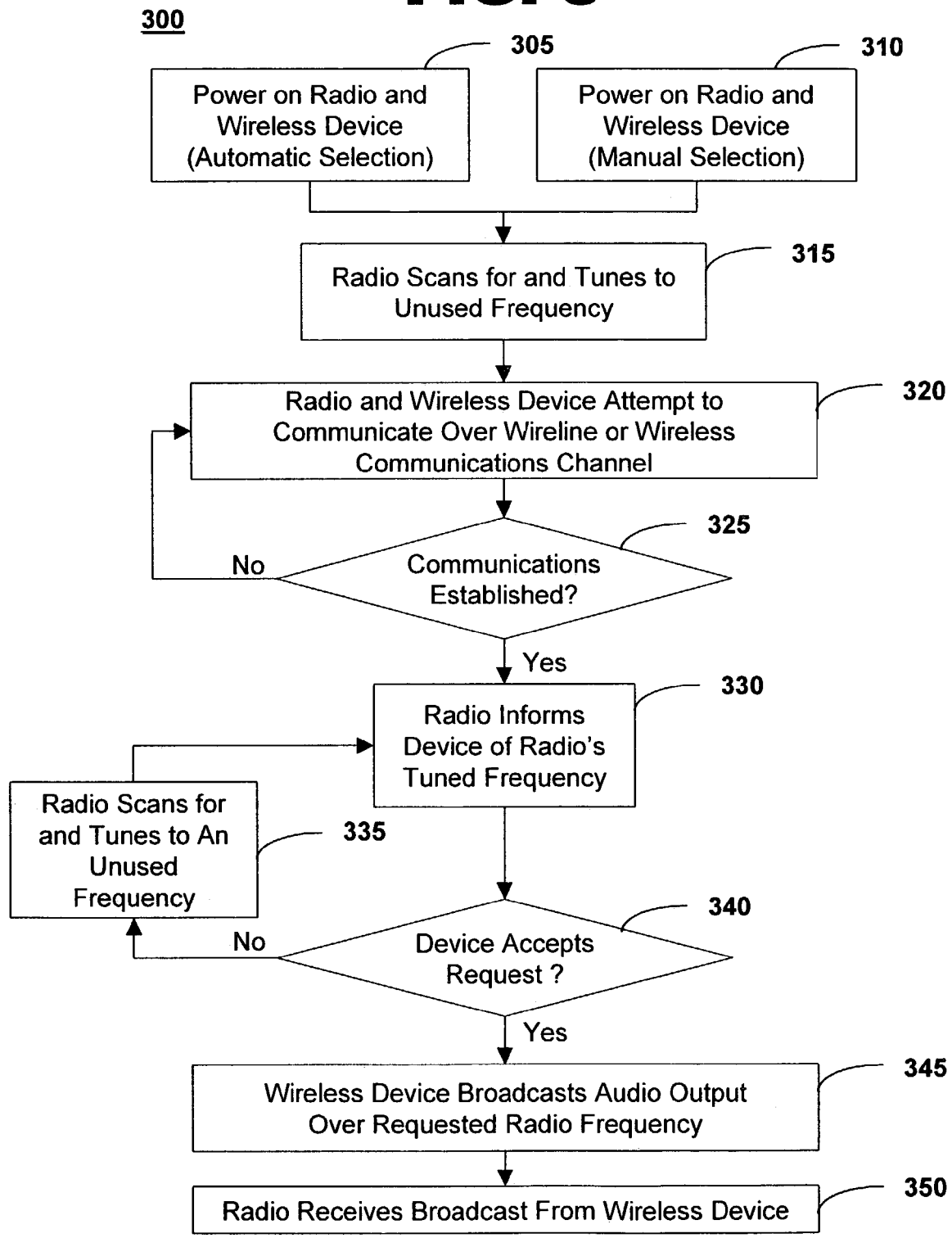
FIG. 3 is a flow diagram of another embodiment of a method to connect an in-vehicle radio to a wireless device, in accordance with the current invention.

FIG. 3 is a flow diagram of another embodiment of a method to connect an in-vehicle radio to a wireless device, in accordance with the present invention at 300. Radio and wireless device connection method 300, which uses a variable frequency selection, begins with powering on the radio and wireless device, either automatically or manually.

With automatic selection, as seen at block 305, the radio and wireless device are powered on and the radio and wireless device connection method begins without any user input other than powering on the radio and wireless devices. With manual selection, as seen at block 310, the user initiates the radio and wireless device connection method with a user selection input.

The radio scans for and tunes to an unused frequency from a band of FM frequencies, as seen at block 315. The radio may monitor at least one frequency in the FM band for an FM broadcast signal and then select an FM broadcast frequency that is devoid of or free from a detectable FM broadcast signal.

The in-vehicle radio receiver and wireless device attempt to communicate over wired line or wireless communications channel, as seen at block 320. The communication between the radio and the wireless device may or may not be successful, as seen at block 325. When the communications are not successful, there may be additional attempts at communicating between the radio and wireless device, as seen back at block 320. When the communication is successful, the radio receiver informs the wireless device of the tuned frequency of the radio, the frequency to which the wireless device needs to be tuned, as seen at block 330. This broadcast request message may be sent to the wireless device via a wireless communication protocol such as Bluetooth or IEEE 802.11. Alternatively, the request message may be sent via a wired communication link using a protocol such as RS-232, media oriented systems transport (MOST), controller area network (CAN) or Ethernet.

The device may or may not accept the request of the radio for the wireless device to broadcast at the specified frequency of the radio, as seen at block 340. When the device does not accept the request to broadcast audio output over the requested radio frequency, the radio may scan for another frequency and tune to an unused frequency, as seen at block 335. The radio proceeds again through the process of informing the device of the new tuned frequency, as seen back at block 330, and waiting for the device to accept a frequency request, as seen again at block 340.

When the wireless device accepts the request from the radio for the wireless device to broadcast over a specified frequency, the device broadcasts audio output at the requested radio frequency, as seen at block 345.

The radio receives the broadcast from the wireless device over the specified frequency and may send the audio signals of the broadcast through audio output speakers, as seen at block 350.

FIG. 4 shows a flow diagram of another embodiment of a method to connect an in-vehicle radio to a wireless device, in accordance with the present invention at 400.

In-vehicle connection method 400 comprises steps to automatically connect a wireless device to an in-vehicle radio such that signals from the wireless device may be played or heard over the vehicle's sound system using an available FM radio frequency. The wireless device may be, for example, a compact disc player, a digital video disc player, a cellular phone, a personal digital assistant, a laptop computer, a video game, an audio player, a video player, an entertainment system, a satellite radio receiver, a telematics unit, a handheld wireless unit, or any portable or aftermarket communication device.

A user selection input indicating the desire to connect the wireless device is provided to the in-vehicle radio, as seen at block 405. The user selection input may be, for example, an in-vehicle radio power-on detection generated by turning on the FM radio. The user selection input may be, for example, an input from the depression of an auxiliary button on the radio head unit. The user selection input may be a button depression indication, a switch input, a voice message, a menu selection, a keypad entry, a touch screen input, a wireless remote input, a wireless device activation input from the wireless device, or the like.

A pre-set local broadcast frequency may be received from the wireless device, as seen at block 410. The pre-set local broadcast frequency may be a factory default setting or a user-adjusted setting on the wireless device. The pre-set local broadcast frequency may be one of a set of broadcast frequencies within the FM band.

The pre-set broadcast frequency may be stored in a memory within the in-vehicle radio, as seen at block 415. When a user selection is input to the in-vehicle radio, the radio may tune itself to the local broadcast frequency so that transmitted RF signals from the wireless device may be received.

Alternatively, a band of FM frequencies may be scanned to determine the local broadcast frequency, as seen at block 420. The band of FM frequencies may be scanned, for example, by adjusting the tuner inside the radio in a predetermined sequence to each one of the sequence of FM channels where an FM signal may be received. Each FM frequency may be monitored for an FM broadcast signal, as seen at block 425. When an FM signal is received at that frequency, another FM channel may be checked until an FM broadcast frequency that is free of FM broadcast signals is found, and the FM broadcast frequency that is free of FM broadcast signals is selected, as seen at block 430.

A suitable local broadcast frequency is determined based on the user selection input, as seen at block 435. The local broadcast frequency may be determined by an in-vehicle radio power-on detection, or by a suitable input such as a button depression indication, a switch input, a voice message, a menu selection, a keypad entry, a touch screen input, a wireless remote input, a wireless device activation input, or the like. Alternatively, the local broadcast frequency may be determined by accessing a stored broadcast frequency in either the in-vehicle radio or in the wireless device. In another embodiment, the local broadcast frequency may be determined by receiving a pre-set broadcast frequency from the wireless device.

When the local broadcast frequency is determined, a broadcast request message including the local broadcast frequency may be sent, as seen at block 440. The broadcast request message with the local broadcast frequency may be sent from the radio to the wireless device, or from the wireless device to the radio. The broadcast request message may be sent over a wired communication link via any suitable wired communication protocol, such as an RS-232 protocol, a MOST protocol, a CAN protocol, an Ethernet protocol, or any standardized or proprietary vehicle communication bus protocol. The broadcast request message may be sent over a wireless communication link via a wireless communication protocol, using any suitable protocol such as a Bluetooth protocol, an IEEE 802.11 protocol, or a short-range wireless protocol.

A broadcast acknowledgment message may be received, as seen at block 445. The broadcast acknowledgment message may be received at the in-vehicle radio from the wireless device, or received at the wireless device from the in-vehicle radio. The acknowledgment message may be sent and received over the wired or wireless communication link. The acknowledgment message may indicate that the selected local broadcast frequency has been received at the wireless device, and that the device has been tuned to transmit at that frequency. The acknowledgment message may also indicate whether a transmission is being broadcast. Other messages and acknowledgments may be sent and received between the wireless device and the in-vehicle radio to control the operation of the units. A message may be sent, for example, requesting the in-vehicle radio to resend the selected local radio broadcast frequency, to select another suitable frequency for broadcasting and send it to the wireless unit, or to direct the radio to tune to a pre-set broadcast frequency determined by the wireless device.

The in-vehicle radio may be tuned to the local broadcast frequency, as seen at block 450. Radio signals may be received from the wireless device at the local broadcast frequency, as seen at block 455. The received broadcast is typically demodulated, amplified and sent to one or more audio channels of the in-vehicle radio, as seen at block 460.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of connecting an in-vehicle radio to a wireless device, comprising:
   providing a user selection input to the in-vehicle radio;
   determining a local broadcast frequency based on the user selection input;
   sending a broadcast request message including the local broadcast frequency wherein the broadcast request message is sent via a wireless communication protocol; and
   tuning the radio to the local broadcast frequency.

2. The method of claim 1 wherein the wireless device is selected from the group consisting of a compact disc player, a digital video disc player, a cellular phone, a personal digital assistant, a laptop computer, a video game, an audio player, a video player, an entertainment system, a satellite radio receiver, a telemanes unit, a handheld wireless unit, and a portable communication device.

3. The method of claim 1 wherein the user selection input comprises an in-vehicle radio power-on detection.

4. The method of claim 1 wherein the user selection input is selected from the group consisting of a button depression indication, a switch input, a voice message, a menu selection, a keypad entry, a touch screen input, a wireless remote input, and a wireless device activation input.

5. The method of claim 1 wherein determining the local broadcast frequency comprises accessing a stored broadcast frequency.

6. The method of claim 1 wherein determining the local broadcast frequency comprises receiving a pre-set broadcast frequency from the wireless device.

7. The method of claim 1 wherein determining the local broadcast frequency comprises:
   scanning a band of FM frequencies;
   monitoring at least one frequency in the FM band for an FM broadcast signal; and
   selecting an FM broadcast frequency free from an FM broadcast signal.

8. The method of claim 1 wherein the wireless communication protocol is selected from the group consisting of a Bluetooth protocol, an IEEE 802.11 protocol, and a short-range wireless protocol.

9. The method of claim 1 further comprising:
   receiving a broadcast acknowledgment message.

10. The method of claim 1 further comprising:
    receiving a broadcast at the local broadcast frequency from the wireless device; and
    sending the received broadcast to at least one audio channel of the in-vehicle radio.

11. The method of claim 1 further comprising:
    receiving a pre-set broadcast frequency from the wireless device; and
    storing the pre-set broadcast frequency in an in-vehicle radio memory.

12. A system for connecting an in-vehicle radio to a wireless device, comprising:
    means for providing a user selection input to the in-vehicle radio;
    means for determining a local broadcast frequency based on the user selection input;
    means for sending a broadcast request message including the local broadcast frequency wherein the broadcast request message is sent via a wireless communication protocol; and
    means for tuning the radio to the local broadcast frequency.

13. The system of claim 12 further comprising:
    means for scanning a band of FM frequencies;
    means for monitoring at least one frequency in the FM band for an FM broadcast signal; and
    means for selecting an FM broadcast frequency free from an FM broadcast signal.

14. The system of claim 12 further comprising:
    means for receiving a broadcast acknowledgment message.

15. The system of claim 12 further comprising:
    means for receiving a broadcast at the local broadcast frequency from the vehicles device; and
    means for sending the received broadcast to at least one audio channel of the in-vehicle radio.

16. The system of claim 12 further comprising:
    means for receiving a pre-set broadcast frequency from the wireless device; and
    means for storing the pre-set broadcast frequency in an in-vehicle radio memory.

17. A computer usable medium including a program to connect an in-vehicle radio to a wireless device, comprising:
    computer program code to provide a user selection input to the in-vehicle radio;
    computer program code to determine a local broadcast frequency based on the user selection input;
    computer program code to send a broadcast request message including the local broadcast frequency wherein the broadcast request message is sent via a wireless communication protocol; and
    computer program code to tune the radio to the local broadcast frequency.

18. The computer usable medium of claim 17 further comprising:
- computer program code to scan a band of FM frequencies;
- computer program code to monitor at least one frequency in the FM band for an FM broadcast signal; and
- computer program code to select an FM broadcast frequency free from an FM broadcast signal.

19. The computer usable medium of claim 17 further comprising:
- computer program code to receive a broadcast acknowledgment message.

20. The computer usable medium of claim 17 further comprising:
- computer program code to receive a broadcast at the local broadcast frequency from the wireless device, and
- computer program code to send the received broadcast to at least one audio channel of the in-vehicle radio.

21. The computer usable medium of claim 17 further comprising:
- computer program code to receive a pro-set broadcast frequency from the wireless device; and
- computer program code to store the pre-set broadcast frequency in an in-vehicle radio memory.

* * * * *